United States Patent
Hori et al.

(10) Patent No.: US 9,407,781 B2
(45) Date of Patent: *Aug. 2, 2016

(54) IMAGE READING DEVICE HAVING ANTENNA INCLUDING COMMUNICATION SURFACE DISPOSED ALONG SIDE WALL

(71) Applicant: BROTHER KOGYO KABUSHIKI KAISHA, Nagoya-shi, Aichi-ken (JP)

(72) Inventors: Yuji Hori, Inuyama (JP); Yasuhiro Asai, Nagoya (JP); Masatsugu Mizuno, Kuwana (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/816,340

(22) Filed: Aug. 3, 2015

(65) Prior Publication Data

US 2015/0341514 A1 Nov. 26, 2015

Related U.S. Application Data

(63) Continuation of application No. 14/227,984, filed on Mar. 27, 2014, now Pat. No. 9,100,522.

(30) Foreign Application Priority Data

Mar. 29, 2013 (JP) ................. 2013-071044

(51) Int. Cl.
*H04N 1/04* (2006.01)
*H04N 1/00* (2006.01)
*H01Q 1/22* (2006.01)
*H01Q 1/36* (2006.01)
*H01Q 21/28* (2006.01)

(52) U.S. Cl.
CPC ............. *H04N 1/00559* (2013.01); *H01Q 1/22* (2013.01); *H01Q 1/2216* (2013.01); *H01Q 1/36* (2013.01); *H01Q 21/28* (2013.01); *H04N 1/00315* (2013.01); *H04N 1/00323* (2013.01); *H04N 1/00602* (2013.01); *H04N 1/00615* (2013.01)

(58) Field of Classification Search
CPC .......... H04N 1/00559; H04N 1/00323; H04N 1/00315
USPC .................................. 358/474, 498, 497, 496
See application file for complete search history.

(56) References Cited

U.S. PATENT DOCUMENTS

| 6,177,950 B1* | 1/2001 | Robb ................ H04M 1/72522 348/14.01 |
| 9,100,522 B2* | 8/2015 | Hori .................... H04N 1/00323 |
| 2003/0169923 A1* | 9/2003 | Butterworth ............. G06K 9/20 382/181 |
| 2010/0190445 A1 | 7/2010 | Minami | |

FOREIGN PATENT DOCUMENTS

| JP | 2006-056017 A | 3/2006 |
| JP | 2010-177938 A | 8/2010 |

* cited by examiner

*Primary Examiner* — Houshang Safaipour
(74) *Attorney, Agent, or Firm* — Merchant & Gould P.C.

(57) ABSTRACT

An image reading device includes a casing, an image reading unit, a mounting board, and an antenna. The casing has a side wall positioned at one end thereof in a first direction. The image reading unit is accommodated in the casing and configured to read an image of an original document by scanning in the first direction. The mounting board is accommodated in the casing and mounts an electronic component that is used when the image reading unit reads the image, the mounting board extending in the first direction. The antenna is accommodated in the casing and configured to receive or transmit a radio signal. The antenna is disposed along and adjacent the side wall.

20 Claims, 8 Drawing Sheets

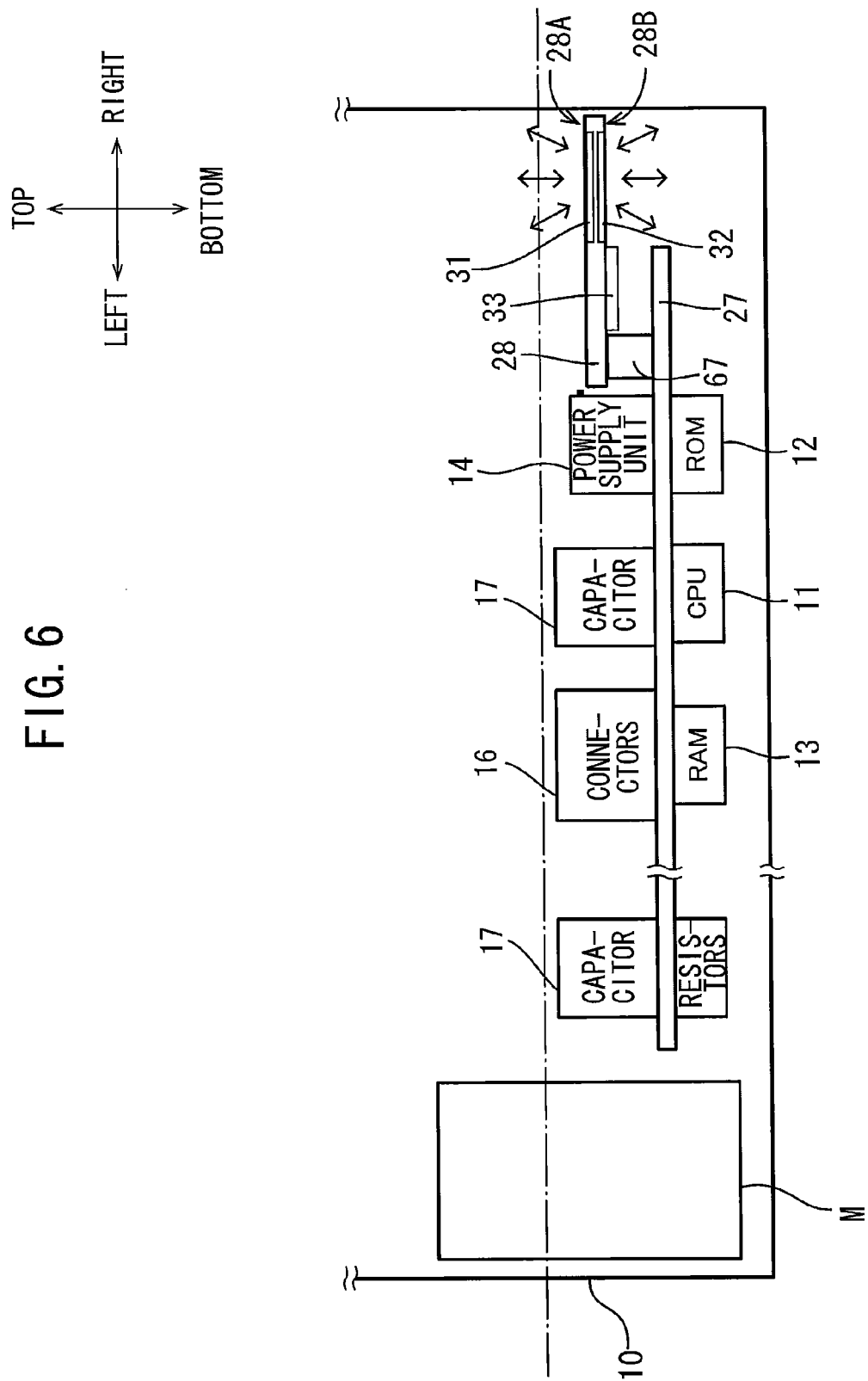

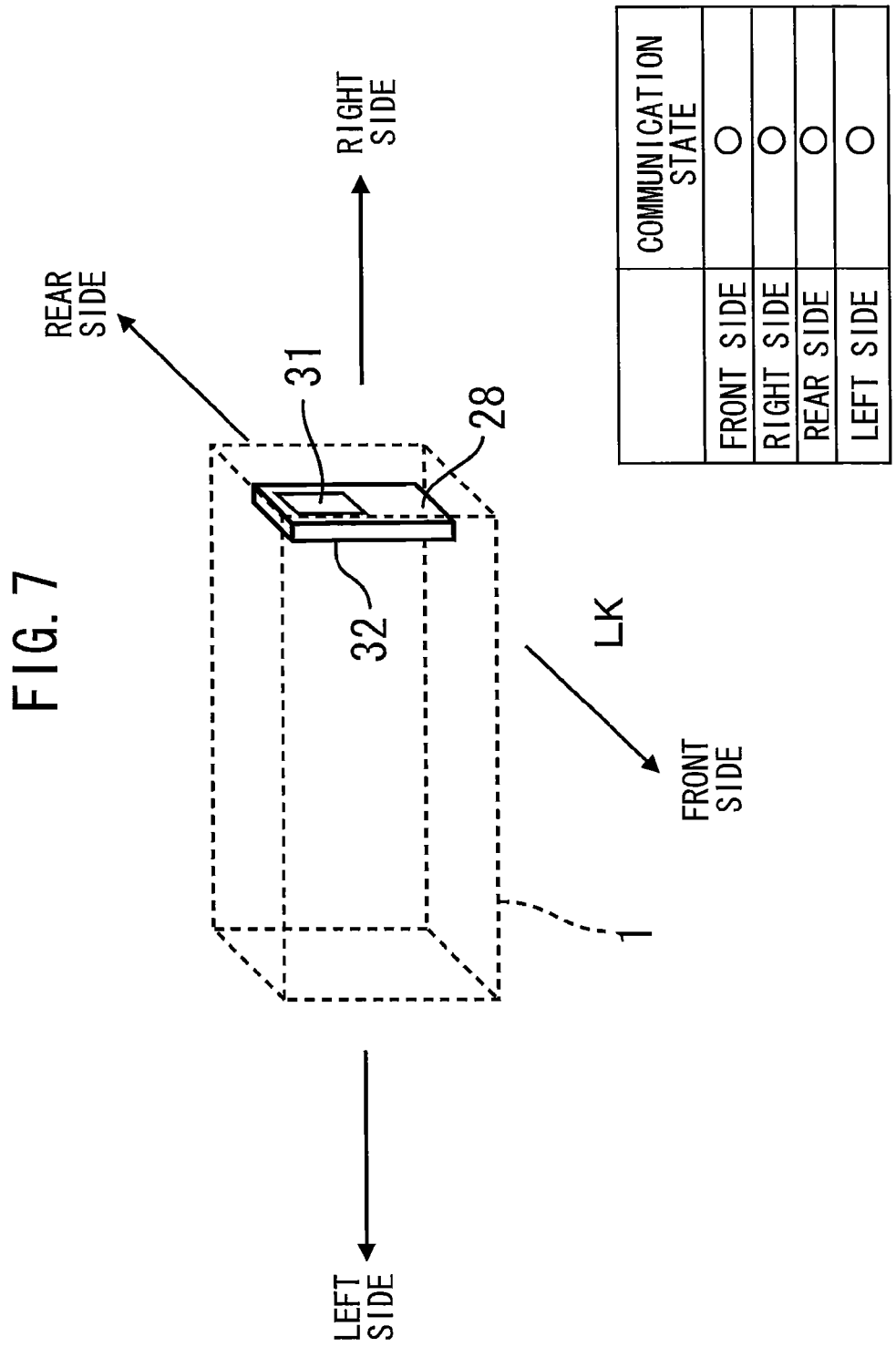

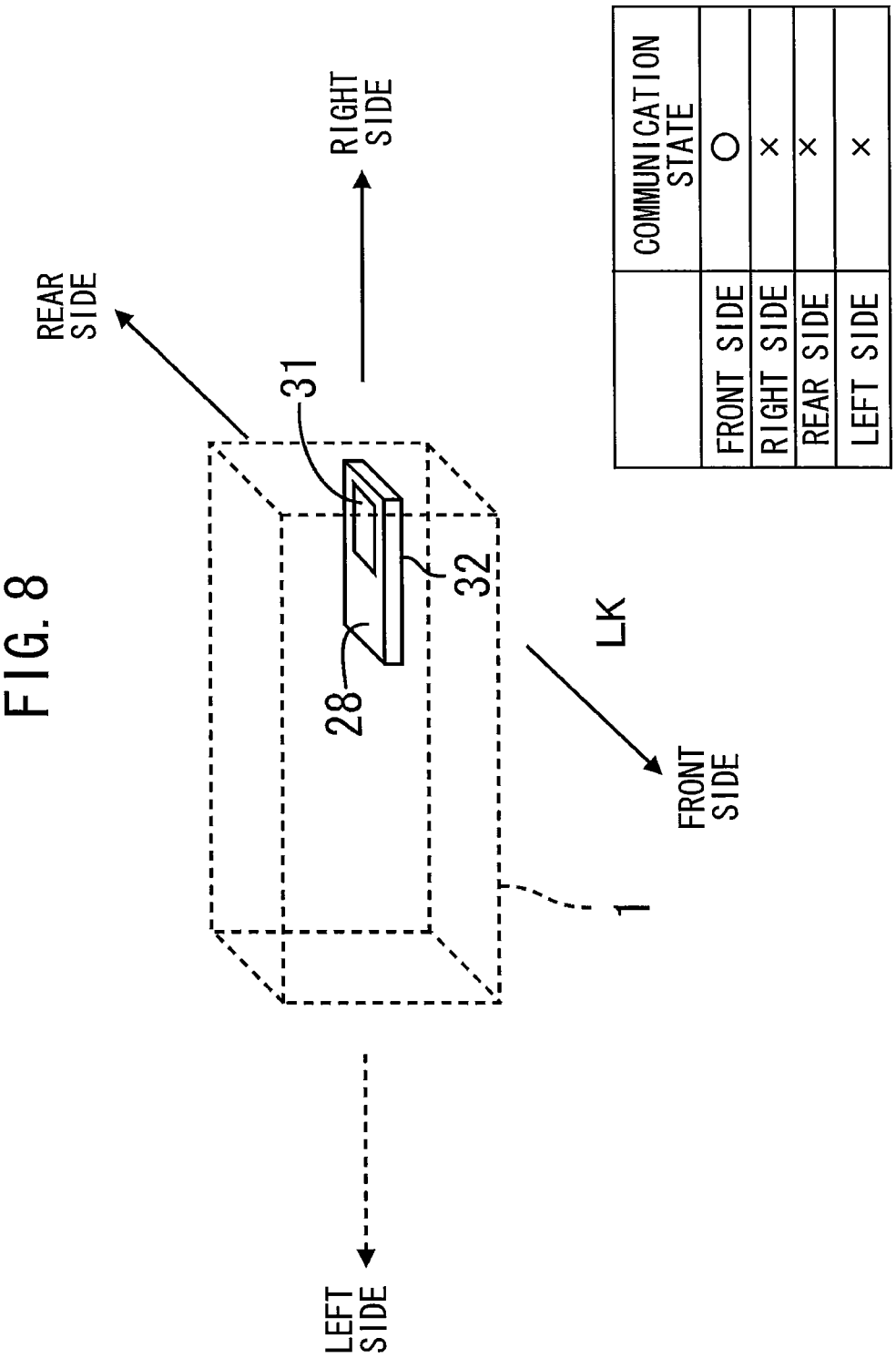

IMAGE READING DEVICE HAVING ANTENNA INCLUDING COMMUNICATION SURFACE DISPOSED ALONG SIDE WALL

CROSS REFERENCE TO RELATED APPLICATION

This application is a continuation application of U.S. patent application Ser. No. 14/227,984, filed Mar. 27, 2014, and further claims priority from Japanese Patent Application No. 2013-071044 filed Mar. 29, 2013. The entire contents of both the priority applications are incorporated herein by reference.

TECHNICAL FIELD

The invention disclosed herein relates to a configuration of an image reading device having a wireless communication function.

BACKGROUND

Japanese Patent Application Publication No. 2006-56017 discloses a device having a wireless communication function. In the device, a cutout part is provided in one portion of a side plate made of a metal plate, and a wireless communication board having an antenna is disposed in the cutout part. This configuration reduces an influence of the side plate on communication with an external device, thereby ensuring the state of the communication with the external information device.

SUMMARY

However, the communication state with external devices such as external information devices can be affected not only by the side plate but also by electronic hardware provided inside the device. For example, the device includes a circuit board for controlling the device therein. The circuit board generates electromagnetic waves when performing a control process and any other processes. The problem is that, if the antenna of the wireless communication board receives the electromagnetic waves generated from the circuit board, noise is generated in signals that are transmitted or received by the wireless communication board, leading to deterioration of the communication state. Moreover, a component containing metal is mounted on the circuit board, and the circuit board itself contains metal that is used to form lines (traces). The problem is that, if the signals that is transmitted or is to be received by the wireless communication board are blocked by the metal in the circuit board and the component, the strength of the signals that are transmitted or received by the wireless communication board are weakened, leading to deterioration of the communication state.

The present invention provides a technique for preventing the deterioration of the state of the communication in the image reading device having the wireless communication function.

In order to attain the above and other objects, the invention provides an image reading device. The image reading device includes a casing, an image reading unit, a mounting board, and an antenna. The casing has a side wall positioned at one end thereof in a first direction. The image reading unit is accommodated in the casing and configured to read an image of an original document by scanning in the first direction. The mounting board is accommodated in the casing and mounts an electronic component that is used when the image reading unit reads the image, the mounting board extending in the first direction. The antenna is accommodated in the casing and configured to receive or transmit a radio signal. The antenna is disposed along and adjacent the side wall.

BRIEF DESCRIPTION OF THE DRAWINGS

The particular features and advantages of the invention as well as other objects will become apparent from the following description taken in connection with the accompanying drawings, in which:

FIG. 6 is an explanatory diagram illustrating a positional relation between a mounting board and an antenna for wireless communications according to a comparative example;

FIG. 7 is an explanatory diagram illustrating communication performance of the image reading device according to the embodiment; and FIG. 8 is an explanatory diagram illustrating communication performance of the image reading device according to the comparative example.

DETAILED DESCRIPTION

1. Mechanical Configuration of Image Reading Device

Figure 1:
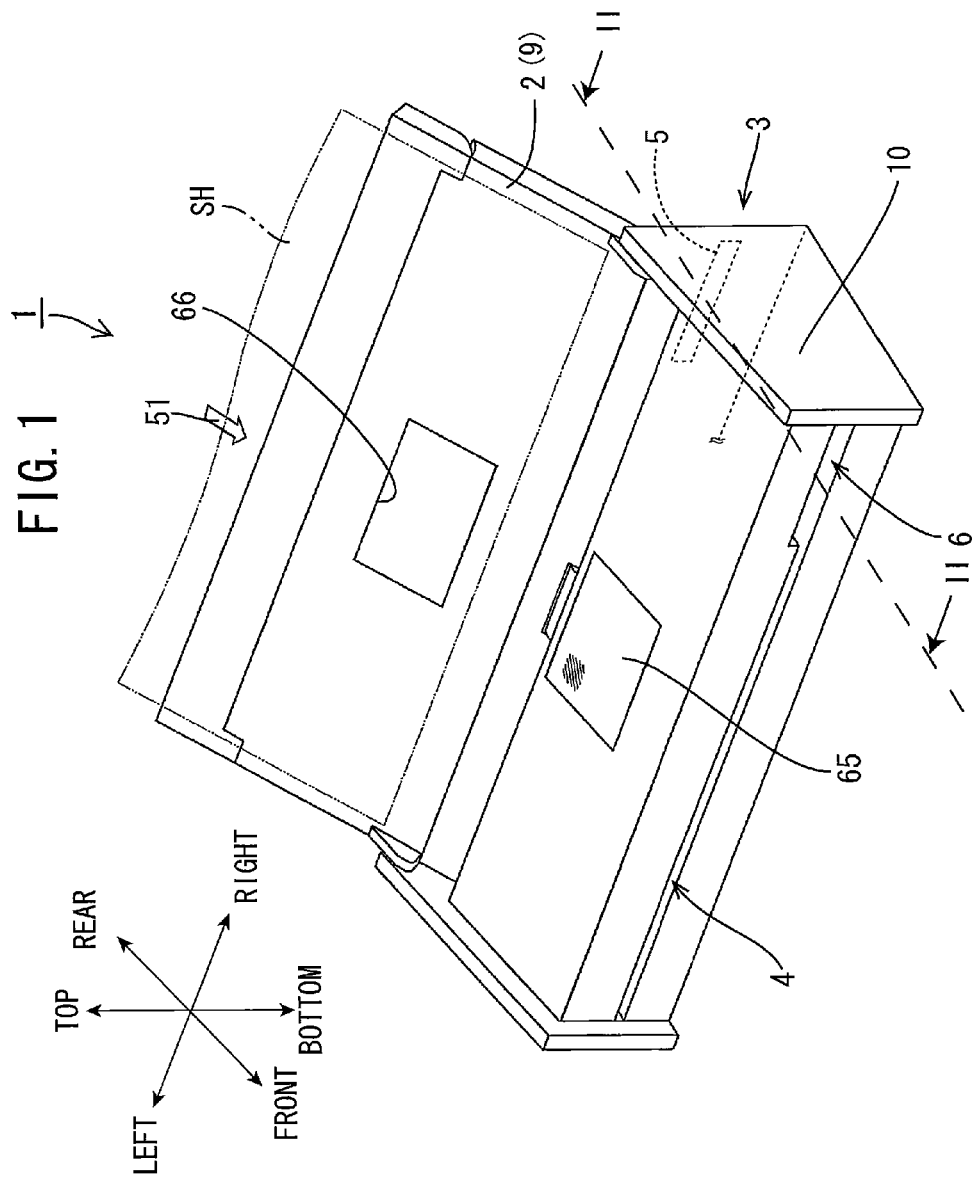
FIG. 1 is a perspective diagram of an image reading device according to an embodiment of the invention.

An image reading device (scanner) 1 according to an embodiment of the invention will be described while referring to the accompanying drawings. The terms "upward", "downward", "upper", "lower", "above", "below", "beneath", "right", "left", "front", "rear" and the like will be used throughout the description assuming that the image reading device 1 is disposed in an orientation in which it is intended to be used. In use, the scanner 1 is disposed as shown in FIG. 1. The phrase "parallel to" means not only exact parallel, but also an almost parallel state in the embodiment.

As shown in FIG. 1, the image reading device 1 includes a paper feed tray 2 (an top cover 9), a main body 3 formed with a sheet discharge opening 4, and a casing 10. The main body 3 includes reading sections 24 and 25 (FIG. 2) therein. A plurality of sheet documents SH can be placed on the paper feed tray 2. The sheet document SH is a sheet type of original document, such as, a plain paper or the like. In accordance with image-reading instructions from a user, the image reading device 1 conveys a sheet document SH placed on the paper feed tray 2 to the sheet discharge opening 4 as indicated by arrow 51. While conveying the sheet document SH, the image reading device 1 reads the sheet document SH by using the reading sections 24 and 25.

The main body 3 is formed with a card insertion opening 5 and a card discharge opening 6. That is, the card insertion opening 5 is formed in a rear surface of the main body 3. A card document C, that is a card type of original, such as a business card, is insertable to the card insertion opening. In accordance with image-reading instructions from a user, the image reading device 1 conveys the card document C inserted into the card insertion opening 5 to the card discharge opening 6. While conveying the card document C, the image reading device reads the card document C by using the reading sections 24 and 25.

Figure 2:
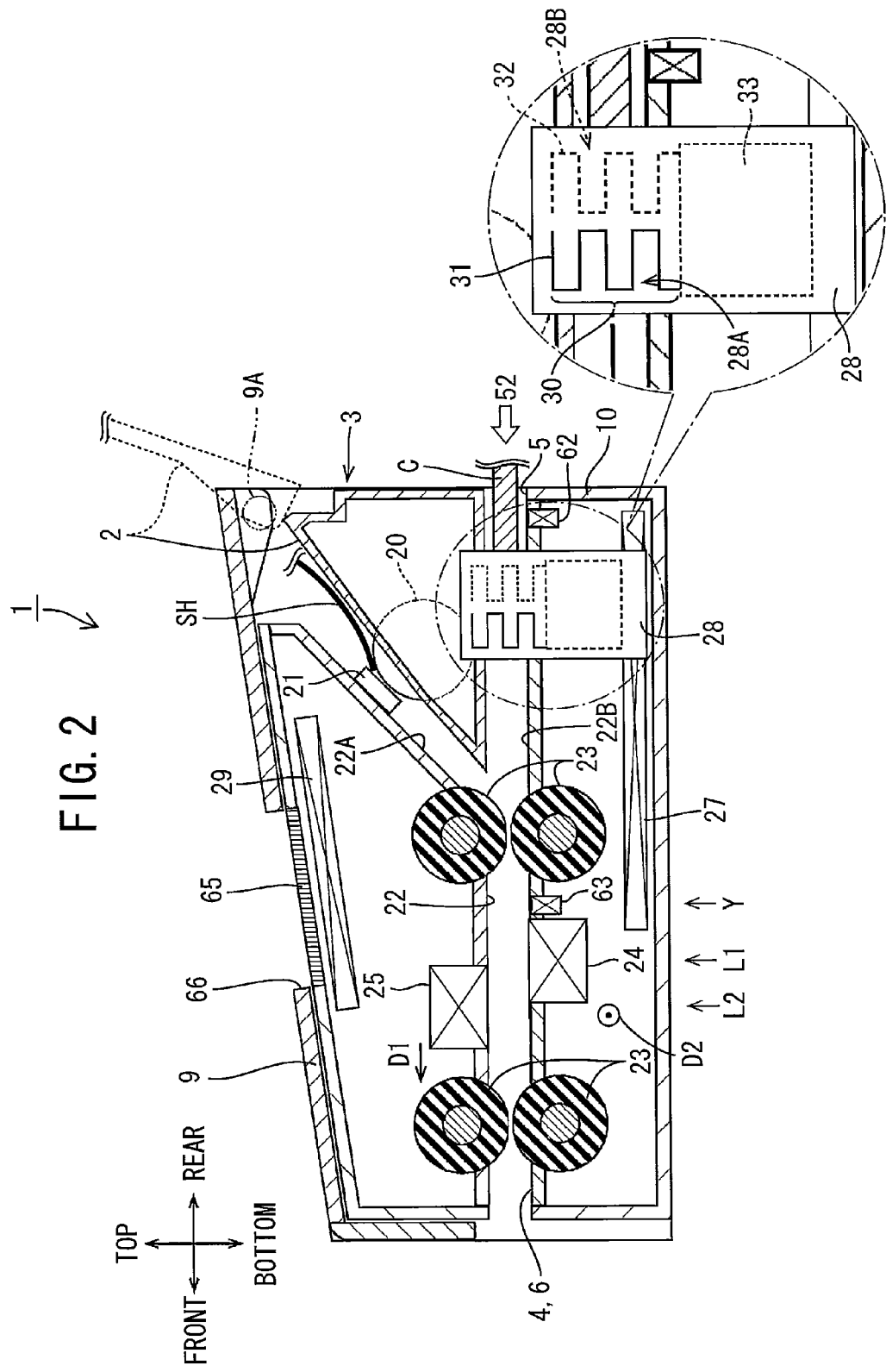
FIG. 2 is a cross section diagram of the image reading device when a top cover is at an uncovering position.

As shown in FIG. 2, the main body 3 is covered with the casing 10 that is made of plastic or metal plate. An upper surface of the casing 10 is covered with the top cover 9. In the casing 10, the main body 3 has a first conveyance path 22A and a second conveyance path 22B. The first conveyance path 22A connects the paper feed tray 2 to the sheet discharge opening 4, and the second conveyance path 22B connects the card insertion opening 5 to the card discharge opening 6. Around the conveyance paths 22A and 22B, the main body further includes a paper feed roller 20, a separation pad 21, conveyance rollers 23, the reading sections 24 and 25, various sensors such as a sheet front sensor (hereinafter referred to as a sheet F sensor) 61 (FIG. 3), a card front sensor (referred to as a card F sensor, hereinafter) 62, a sheet rear sensor (hereinafter referred to as a sheet R sensor) 63 (FIG. 3), and a card rear sensor (hereinafter referred to as a card R sensor) 64, various circuit boards such as a mounting board 27, a wireless communication board 28, and a display board 29, a touch panel 65, and a motor M (See FIG. 3).

The top cover 9 rotates about a shaft 9A with respect to the main body 3 between a covering position (state) and an uncovering position (state). When the top cover 9 is moved to the covering position, the top cover 9 covers an upper portion of the main body 3. When the top cover 9 is moved to the uncovering position, the top cover 9 does not cover the upper portion of the main body and thus the upper portion of the main body 3 is exposed. The top cover 9 at an opening position forms a rear end portion of the paper feed tray 2 shown in FIG. 1.

Figure 3:
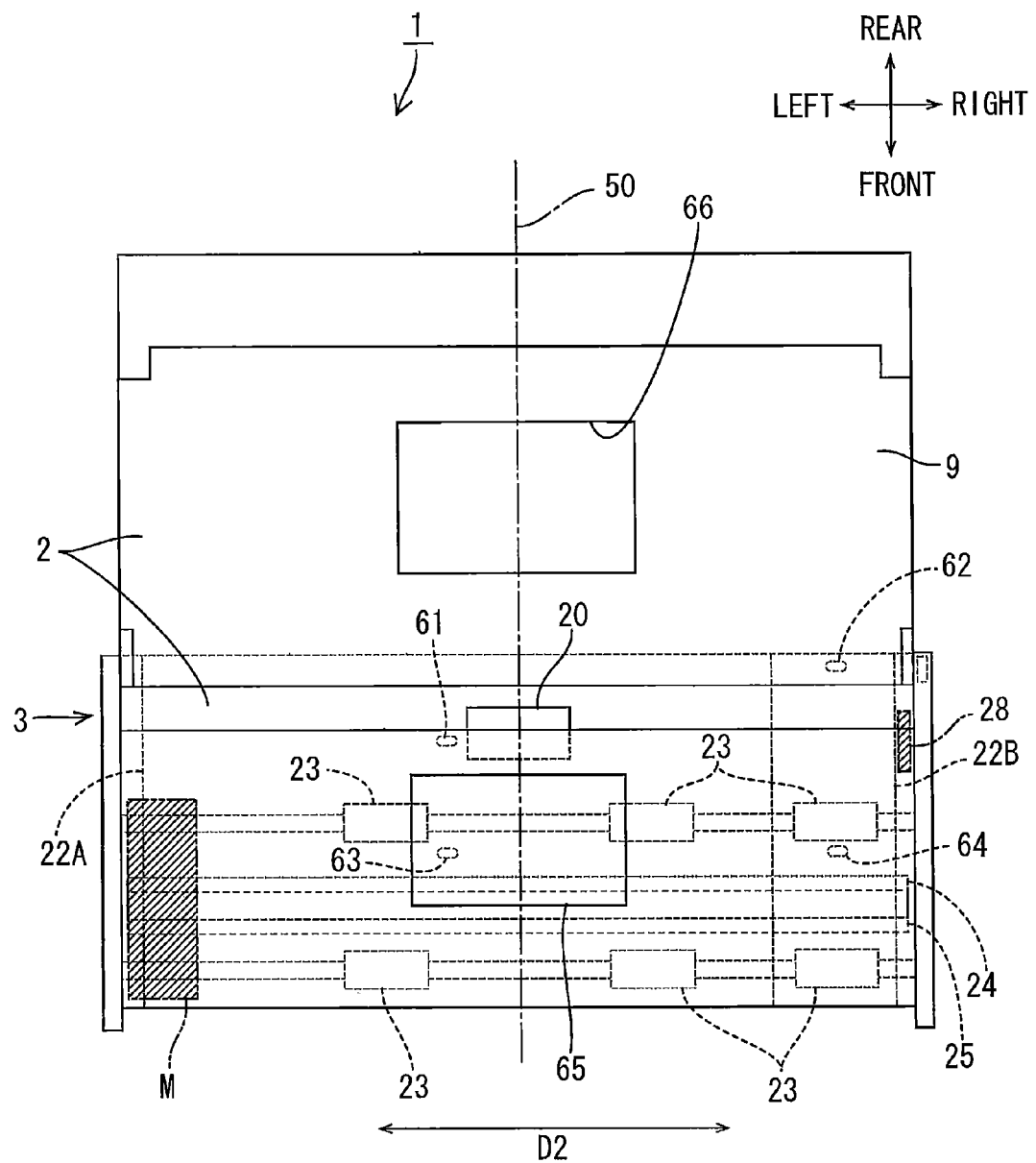
FIG. 3 is a top view of the image reading device when the top cover is at an uncovering position.
Figure 5:
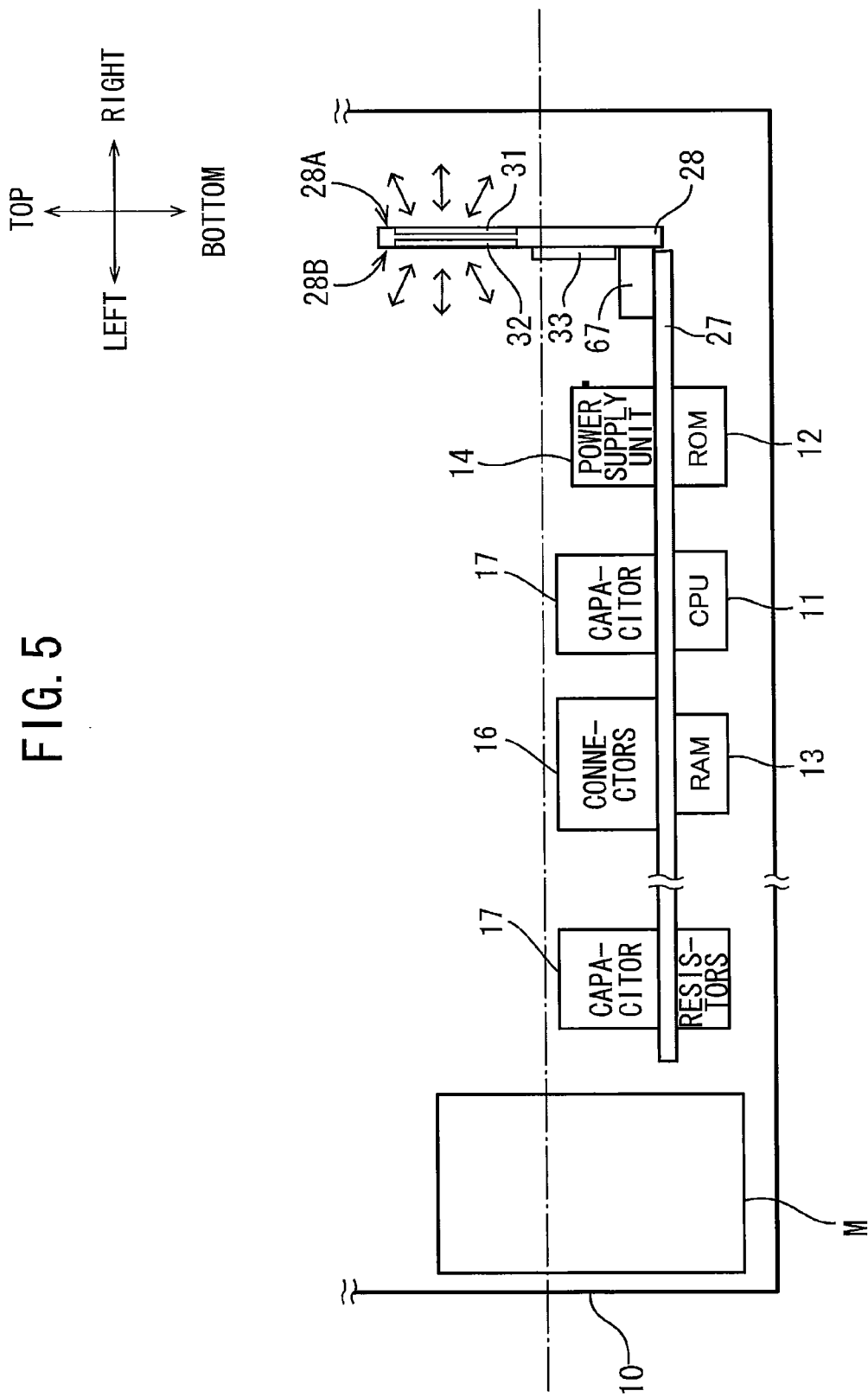
FIG. 5 is an explanatory diagram illustrating a positional relation between a mounting board and an antenna for wireless communications according to the embodiment.

As shown in FIG. 5, the paper feed roller 20 is rotated and driven by the motor M (see FIG. 3). The paper feed roller 20 can contact to a sheet document SH placed on the paper feed tray 2, and draw a plurality of sheet documents SH placed on the paper feed tray 2 into the main body 3 by using a frictional force. The separation pad 21 uses a frictional force to separate one sheet document SH from a plurality of sheet documents SH. Accordingly, the sheet document SH is separated from the plurality of sheet documents SH placed on the paper feed tray 2, and is drawn into the main body 3.

The conveyance rollers 23 are rotated (driven) by the motor M. Here, the motor M includes a coil and a magnet that have a metal portion. Metal is used for shafts of the conveyance rollers 23. The conveyance rollers 23 conveys the sheet document SH that has been drawn into the main body 3 along the first conveyance path 22A. The conveyance rollers 23 can contact to a card document C inserted into the card insertion opening 5 as indicated by arrow 52, and convey the card document C along the second conveyance path 22B. The direction in which the documents SH and C are conveyed along the conveyance paths 22A and 22B is referred as a conveyance direction D1.

As shown in FIG. 2, the conveyance paths 22A and 22B are separated in the vertical direction on upstream side in the conveyance direction D1 (that is, rear part of the main body 3). The conveyance path 22A is positioned above the second conveyance path 22B. The two conveyance paths 22A and 22B joint to one common conveyance path 22. In other words, the downstream side of the conveyance path 22A in the conveyance direction D1 is made in common with the downstream side of the conveyance path 22B in the conveyance direction D1. The reading sections 24 and 25 are disposed on the common conveyance path 22. The reading sections 24 and 25 read images of the documents SH and C that are conveyed by the conveyance rollers 23 on the common conveyance path 22. Metal is used for an exterior case of the reading sections 24 and 25 and internal board of the reading sections 24 and 25.

Figure 4:
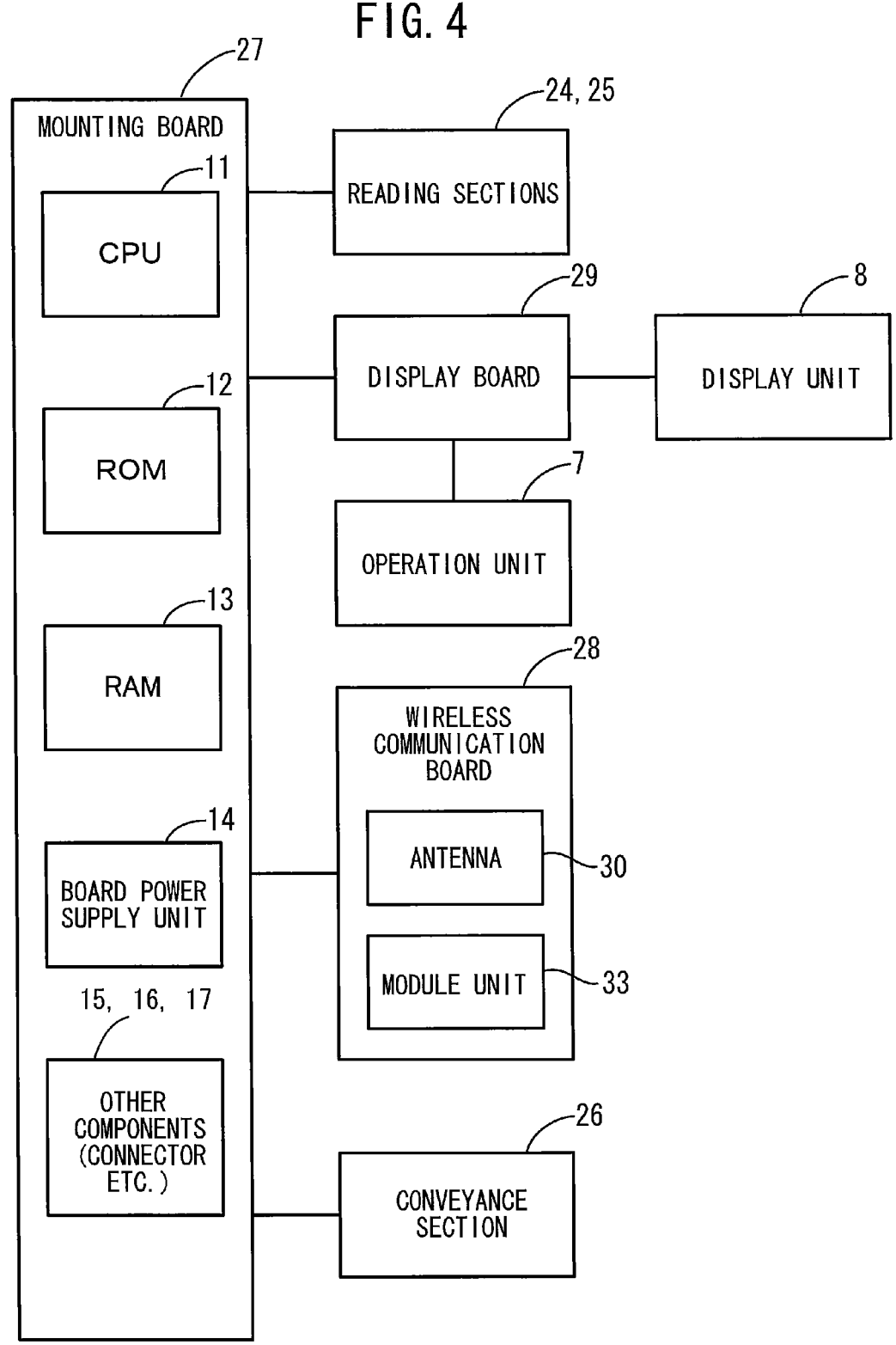
FIG. 4 is a block diagram illustrating an electrical configuration of the image reading device.

Moreover, the conveyance rollers 23 send the documents SH and C being conveyed on the common conveyance path 22 to the discharge openings 4 and 6, respectively. That is, as shown in FIG. 4, the image reading device 1 includes a conveyance section 26 having the motor M, the paper feed roller 22, the conveyance rollers 23, and the first and second conveyance paths 22A and 22B. When the conveyance section 26 conveys the document SH or C, the motor M, the paper feed roller 20, and the conveyance rollers 23 conveys the sheet document SH along the first conveyance path 22A, or the card document C along the second conveyance path 22B.

The first reading section 24 is disposed along the common conveyance path 22 and on a lower side of the main body 3. The second reading section 25 is disposed along the common conveyance path 22 and on an upper side of the main body 3. The reading sections 24 and 25 read, at reading positions L1 and L2, the documents SH and C conveyed along the common conveyance path 22 by scanning in a main scanning direction D2 (i.e. left-right direction) perpendicular to the conveyance direction D1. The phrase "perpendicular to" herein means not only exact perpendicular, but also a substantially perpendicular state that is few degrees shifted from the orthogonal angle, for example.

(Configurations of Various Sensors)

The placement and functions of the various sensors will be described. As shown in FIG. 3, the sheet F sensor 61 is positioned facing the paper feed tray 2. The sheet F sensor 61 is located near a center line 50 in the main scanning direction D2. The sheet F sensor 61 detects whether or not a sheet document SH is located on the paper feed tray 2. The card F sensor 62 is located near the card insertion opening 5 on the second conveyance path 22B. The card F sensor 62 detects whether or not a card document C is inserted into the card insertion opening 5.

As shown in FIG. 2, the sheet R sensor 63 is located on the common conveyance path 22, at a detection position Y that is closer to an upstream side in the conveyance direction D1 than the reading positions L (L1, L2). As shown in FIG. 3, the sheet R sensor 63 is located near the center line 50 in the main scanning direction D2. The sheet R sensor 63 is turned ON when the sheet document SH passes the detection position Y on the common conveyance path 22, and is turned OFF when no sheet document SH passes the detection position Y. That is, the sheet R sensor 63 detects the position of the sheet document SH on the first conveyance path 22A.

As shown in FIG. 3, the card R sensor 64 is located on the common conveyance path 22, at the same detection position Y as the sheet R sensor 63 in the conveyance direction D1. The card R sensor 64 is located in a right end portion in the main scanning direction D2. The card R sensor 64 is turned ON when the card document C passes the detection position Y on the common conveyance path 22, and is turned OFF when no card document C passes the detection position Y. That is, the card R sensor 64 detects the position of the card document C on the second conveyance path 22B.

(Configuration of Various Boards)

The placement and configuration of the various boards will be described. As shown in FIG. 2, the mounting board 27 is disposed at a side of a bottom wall of the casing 10. That is, the mounting board 27 is adjacent the bottom wall of the casing 10. The mounting board 27 has an plate-like shape. A normal direction of the surface of the mounting board is equal to an up-down direction. Moreover, the mounting board 27 is in a rectangular shape having a long side and a short side. The mounting board 27 is disposed such that the long side extends in a left-right direction (i.e. main scanning direction), and the short side extends in a front-rear direction. The mounting board 27 is disposed along the bottom wall of the casing.

As shown in FIG. 4, electronic components, such as a central processing unit (CPU) 11, a ROM 12, a RAM 13, and a board power supply unit 14, are mounted on the mounting board 27. For example, as shown in FIG. 5, the short electronic components that are relatively short in height, such as the CPU 11, the ROM 12, the RAM 13, and resistors 15, are mounted on a lower surface of the mounting board 27. The tall electronic components that are relatively tall to the short electronic components, such as the board power supply unit 14, connectors 16, and capacitors 17, are mounted on an upper surface of the mounting board 27. The way the electronic components are mounted on the upper and lower surfaces as described above is one example. All the electronic components may be mounted on the upper or lower surface.

In the ROM 12, programs for executing each part of the image reading device 1 are stored. In accordance with the programs loaded from the ROM 12, the CPU 11 controls each part of the image reading device 1. For example, in accordance with the programs loaded from the ROM 12, the CPU 11 controls the reading sections 24 and 25 to read images of the documents SH and C, and stores the generated read data in the RAM 13. That is, the electronic components that are used when the reading sections 24 and 25 read the images are mounted on the mounting board 27. In accordance with the programs loaded from the ROM 12, the CPU 11 drives the motor M of the conveyance section 26, thereby conveying the documents SH and C along the conveyance paths 22A and 22B. The board power supply unit 14 is electrically connected to an external power source (not shown), and receives, from the external power source, the power required for the above control.

The wireless communication board 28 is used for wireless communication with portable terminals, such as mobile phones, or wireless LAN routers. As shown in FIG. 3, the wireless communication board 28 is disposed, at a side of the right sidewall of the casing 10, or adjacent the right sidewall of the casing 10, and along the right sidewall. The wireless communication board 28 is connected to the mounting board 27 by a connector 67. The connector 67 is relatively short in height compared to the tall electronic components on the mounting board 27. The wireless communication board 28 has a plate-like shape. The wireless communication board 28 is disposed such that a normal direction of the surface of the wireless communication board 27 is equal to a left-right direction (i.e. main scanning direction). That is, the wireless communication board 28 is disposed to be perpendicular to the mounting board 27 by the connector 67. Moreover, as shown in FIG. 2, the wireless communication board 28 has a rectangular shape having a long side and a short side. The long side of the wireless communication board 28 extends in an up-down direction (vertical direction), and the short side of the wireless communication board 28 extends in a front-rear direction.

As shown in FIG. 4, the wireless communication board 28 includes an antenna 30 and a module unit 33. The antenna 30 is an interface that transmits radio signals to portable terminals and receives radio signals from portable terminals. The antenna 30 includes a receiving surface 31 that can receive radio signals, and a transmitting surface 32 that can transmit radio signals. On the receiving surface 31, lines (traces) are arranged in a planar pattern to receive radio signals. On the transmitting surface 32, lines (traces) are arranged in a planar pattern to transmit radio signals. The module unit 33 controls the antenna 30. That is, the module unit 33 is connected to the lines that constitute the receiving surface 31 of the antenna 30, and to the lines that constitute the transmitting surface 32. According to the configurations of the module unit 33 and the antenna 30, a circuit for controlling the transmitting and receiving of radio signals is formed.

As shown in FIGS. 2 and 3, the wireless communication board 28 has a first surface 28A and a second surface 28B that is opposite side of the outer surface 28A. The first surface 28A is disposed at a side of the right sidewall of the casing 10. Specifically, the first surface 28A faces the right sidewall of the casing 10. The second surface 28B faces an inner side of the casing 10. The receiving surface 31 is disposed on the first surface 28A. The transmitting surface 32 is disposed on the second surface 28B. On the wireless communication board 28, the receiving surface 31 and the transmitting surface 32 are disposed above the module unit 33. The receiving surface 31 and the transmitting surface 32 do not to overlap each other in the front-rear direction. More specifically, the receiving surface 31 is disposed on an upper front side of the first surface 28A. The transmitting surface 32 is disposed on an upper rear side of the second surface 28B.

The wireless communication board 28 is disposed at a lower rear side of the right sidewall of the casing 10. The transmitting and receiving surfaces 31 and 32 of the wireless communication board 28 are placed at positions that do not overlap with the reading sections 24 and 25 and the conveyance rollers 23 in the front-rear direction. That is, the transmitting and receiving surfaces 31 and 32 are disposed at rear side of the reading sections 24 and 25 and the conveyance rollers 23.

The transmitting and receiving surfaces 31 and 32 of the wireless communication board 28 are placed at positions that do not overlap with the mounting board 27 in the up-down direction. That is, the transmitting and receiving surfaces 31 and 32 are disposed above the mounting board 27. More specifically, as shown in FIG. 5, the transmitting and receiving surfaces 31 and 32 are disposed above the tall electronic components (14, 16, and 17) mounted on the upper surface of the mounting board 27 (see the two-dot chain line).

As shown in FIG. 2, the touch panel 65 is provided on the upper surface of the casing 10. The touch panel 65 includes, for example, a liquid crystal display unit (LCD), and displays the state of the image reading device 1. In this case, the touch panel 65 functions as a display unit 8 (see FIG. 4). The top cover 9 is formed with an opening 66 at a position corresponding to the touch panel 65. The opening 66 exposes the touch panel 65 even when the top cover 9 is in the covering state. Various buttons are displayed on the touch panel 65 to accept instructions from a user. In this case, the touch panel 65 functions as an operation unit 7 (see FIG. 4).

The display board 29 is disposed immediately below the touch panel 65. That is, the display board 29 is disposed at a side of an upper wall of the casing 10 in the up-down direction, or on a side opposite to a side where the mounting board 27 is placed. That is, the display board 29 is adjacent the upper wall. In other words, the mounting board 27 is disposed at the bottom end region in the casing 10 and the display board 29 is disposed at the upper end region in the casing 10. The display board 29 is in a plate-like shape, and is disposed parallel to the upper wall of the main body 3. The display board 29 is connected to the touch panel 65. The display board 29 includes a circuit to drive the touch panel 65 that functions as the display unit 8.

As shown in FIG. 3, the motor M is disposed in a left side end portion of the casing 10 in the left-right direction or on an opposite side to the wireless communication board 28. The motor M is connected to each of the various rollers. As shown in FIG. 5, the motor M is placed at a bottom surface side of the casing 10 and on a left side of the mounting board 27 that is similarly placed at the bottom surface side of the casing 10. That is, the motor M is adjacent the bottom wall of the casing 10.

2. Advantageous Effects of the Present Embodiment (1) In the image reading device 1 of the embodiment, the mounting board 27 and the wireless communication board 28 are disposed to be perpendicular to each other, not parallel to each other. FIG. 6 shows a comparative example. As shown in FIG. 6, if the mounting board 27 and the wireless communication board 28 are disposed parallel to each other, a surface of the mounting board 27 is adjacent a surface of the wireless communication board 28. Accordingly, between the adjacent surfaces, a region where the mounting board 27 and the wireless communication board 28 are connected can be easily secured. Therefore, the connector 67 that has a relatively large area and is relatively short in height can be used to connect the mounting board 27 and the wireless communication board 28 in a stable manner.

In this case, however, the transmitting and receiving surfaces 31 and 32 of the wireless communication board 28 are disposed at positions that overlap with the mounting board 27 in the up-down direction. Therefore, if electromagnetic waves generated from the electronic components mounted on the mounting board 27 are received by the transmitting and receiving surfaces 31 and 32 of the wireless communication board 28, noise emerges in signals that are transmitted and received by the wireless communication board 28, leading to the deterioration of the communication state. Further, if the radio signals that are transmitted and received by the transmitting and receiving surfaces 31 and 32 of the wireless communication board 28 are blocked by the mounting board 27 or by metal sections of the electronic components mounted on the mounting board 27, the strength of signals that are transmitted and received by the wireless communication board 28 is weakened, leading to the deterioration of the communication state.

In the image reading device 1 of the embodiment, the mounting board 27 and the wireless communication board 28 are disposed perpendicular to each other. Therefore, compared with the comparative example where the mounting board 27 and the wireless communication board 28 are disposed parallel to each other, the wireless communication board 28 can be placed at a remote place from the mounting board 27.

For example, if the transmitting and receiving surfaces 31 and 32 of the antenna 30 on the wireless communication board 28 are close to the electronic components such as the board power supply unit 14 and CPU 11, there are adverse effects that the transmitting and receiving surfaces 31 and 32 receives electromagnetic waves generated from the electronic components. However, in the image reading device of the embodiment, even as the transmitting and receiving surfaces 31 and 32 of the antenna 30 are close to the electronic components such as the board power supply unit 14 as shown in FIG. 5, the transmitting and receiving surfaces 31 and 32 of the antenna 30 are disposed above the electronic components such as the board power supply unit 14. Therefore, this configuration of the image reading device 1 can inhibits the transmitting and receiving surfaces 31 and 32 from receiving the electromagnetic waves generated from the electronic components such as the board power supply unit 14. Further, the configuration inhibits the mounting board 27 and the metal sections of the electronic components mounted on the mounting board 27 from blocking the radio signals that are transmitted and received by the transmitting and receiving surfaces 31 and 32 of the wireless communication board 28.

(2) In particular, in the image reading device 1 of the embodiment, the transmitting and receiving surfaces 31 and 32 on the wireless communication board 28 are disposed above the module unit 33. The transmitting and receiving surfaces 31 and 32 of the wireless communication board 28 are disposed above the tall electronic components (14, 16, 17) mounted on the upper surface of the mounting board 27. This configuration prevents the radio signals that are transmitted and received by the transmitting and receiving surfaces 31 and 32, or especially the radio signals propagating that are perpendicularly transmitted and received by the transmitting and receiving surfaces 31 and 32 from being blocked by the mounting board 27 and the metal sections of the electronic components mounted on the mounting board 27, thereby preventing the deterioration of the communication state.

(3) As a result, there is an improvement in the directional dependence of the communication state. FIG. 7 shows the directional dependence of the communication state measured by using the image reading device 1 of the embodiment. FIG. 8 shows the directional dependence of the communication state measured by using the comparative example of the image reading device 1 shown in FIG. 6. In measuring the directional dependence of the communication state, the communication strength is measured at points a certain distance LK away from four sides of the image reading device 1, that is, the front, rear, right, and left sides. If the communication strength is greater than or equal to a specified value, it is determined that a wireless terminal can be used to wirelessly communicate with the image reading device 1 (this state is shown by symbol "o" in FIGS. 7 and 8). If the communication strength is less than the specified value, it is determined that it is difficult to wirelessly communicate with the image reading device 1 by using a wireless terminal (this state is shown by symbol "x" in FIG. 8).

As shown in FIG. 8, in the comparative example of the image reading device 1 shown in FIG. 6, the communication state of the front side of the image reading device 1 that is relatively closer to the transmitting surface 32 of the wireless communication board 28 is good. However, the communication state of the other sides of the wireless communication board 28 is not good. As shown in FIG. 7, in the case of the image reading device 1 of the embodiment, the communication state of all the four sides of the wireless communication board 28 is good. The reason is that the above-described configuration of the embodiment prevents the mounting board 27 and the metal sections of the electronic components mounted on the mounting board 27 from blocking the radio waves.

(4) Metal is used for an exterior case of the reading sections 24 and 25 and internal board of the reading sections 24 and 25. Metal is used for shafts of the conveyance rollers 23. In the image reading device 1, the transmitting and receiving surfaces 31 and 32 are placed at positions that do not overlap with the reading sections 24 and 25 and the conveyance rollers 23 in the front-rear direction. This configuration can prevent the radio signals transmitted and received by the transmitting and receiving surfaces 31 and 32 from being blocked by the metal sections of the reading sections 24 and 25 and the conveyance rollers 23.

(5) In the image reading device 1 of the embodiment, the transmitting and receiving surfaces 31 and 32 are disposed at an opposite side to the motor M in the main body 3 in the left-right direction. Here, metal is used for a coil and a magnet in the motor M. In this image reading device 1, the transmitting and receiving surfaces 31 and 32 are disposed away from the motor M in the left-right direction. This configuration can prevent the radio signals transmitted and received by the transmitting and receiving surfaces 31 and 32 from being blocked by the metal sections of the motor M.

(6) In the image reading device 1 of the embodiment, in the casing 10, the display board 29 is disposed at a side of the upper wall of the casing 10, and the mounting board 27 is disposed at a side of the bottom wall of the casing 10. In the embodiment, the touch panel 65 is provided on the upper surface of the casing 10 for considering user's convenience. Accordingly, the display board 29 that controls display of the touch panel 65 is placed immediately below the touch panel 65 to maintain high levels of display characteristics of the touch panel 65. Further, the mounting board 27 can be provided away from the touch panel 65, or at the upper surface side in the casing 10.

In this image reading device, the touch panel 65 is provided on the upper surface of the casing 10, and the mounting board 27 is provided at the bottom side of the casing 10. This configuration is convenient for a user, and the image reading device 1 suppress mutual interference between the metal sections of the boards 27 and 29.

Modifications

While the invention has been described in detail with reference to the embodiment thereof, it would be apparent to those skilled in the art that various changes and modifications may be made therein without departing from the scope of the invention.

In the embodiment, the image reading device 1 is explained. However, the present invention is applicable to devices having a scanner function, such as, a multifunction peripheral having a printer function, a copier function, and a facsimile function in addition to a scanner function. Further, the present invention is applicable to devices not having a scanner function, only have to have a mounting board 27 and a wireless communication board 28. The configuration of the mounting board 27 and the wireless communication board 28 described in the embodiment can suppress deterioration of communication state.

In the embodiment, the mounting board 27 includes one CPU 11. However, the mounting board 27 may include plurality of CPUs 11. Further, the mounting board 27 may include hardware circuits such as ASIC (Application Specific Integrated Circuit).

(3) Programs executed by the CPU 11 are not necessarily stored in the ROM 12. The programs may be stored in the CPU 11 or any other storage device.

(4) In the above embodiment, the wireless communication board 28 is placed at the upper surface side of the mounting board 27 as an example. However, if the mounting board 27 is placed in an upper section of the casing 10, the wireless communication board 28 may be placed at a lower surface side of the mounting board 27. In this case, on the wireless communication board 28, the transmitting and receiving surfaces 31 and 32 is disposed below the module unit 33 the transmitting and receiving surfaces 31 and 32 of the wireless communication board 28 is disposed below the electronic components mounted on the lower surface side of the mounting board 27.

What is claimed is:
1. An image reading device comprising:
a casing;
an image reading unit accommodated in the casing and extending in a first direction, the image reading unit configured to read an image of an original document;
a first board accommodated in the casing and mounting an electronic component, the first board extending in the first direction and a second direction orthogonal to the first direction;
a second board extending in the second direction and a third direction orthogonal to the first direction and the second direction; and
an antenna arranged on the second board.

2. The image reading device according to claim 1, wherein the antenna is a line arranged on the second board.

3. The image reading device according to claim 1, further comprising:
a motor; and
a roller configured to be rotated by the motor about a rotational axis extending in the first direction,
wherein the casing has:
a side wall positioned at one end of the casing in the first direction; and
another side wall positioned at another end of the casing in the first direction,
wherein the antenna is closer to the side wall than the roller in the first direction, and
wherein the motor is closer to the another side wall than the roller in the first direction.

4. The image reading device according to claim 3, wherein a conveying path is defined in the casing, the conveying path extending in the second direction and positioned on upside of the first board, the original document being conveyed on the conveying path,
wherein the roller positioned on the conveying path,
wherein the image reading unit includes a first image reading unit positioned on one side of the conveying path.

5. The image reading device according to claim 3, further comprising a guide wall inside the casing, the guide wall defining a conveying path, the guide wall extending in the second direction and positioned on upside of the first board, the original document being conveyed along the guide wall,
wherein the roller positioned on the conveying path,
wherein the image reading unit includes a first image reading unit positioned on one side of the conveying path.

6. The image reading device according to claim 4, wherein the image reading unit further includes a second image reading unit positioned on another side of the conveying path so that the conveying path is interposed between the first image reading unit and the second image reading unit.

7. The image reading device according to claim 6, wherein the image reading unit is positioned shifted from the first reading unit and the second reading unit in the second direction.

8. The image reading device according to claim 3, further comprising a CPU arranged on the first board and configured to control the image reading unit,
wherein the antenna is positioned on upside of the CPU.

9. The image reading device according to claim 8, wherein the first board is interposed between the CPU and the antenna.

10. The image reading device according to claim 1, the second board further includes a module unit configured to control transmitting and receiving of the radio signal,
wherein the antenna is positioned on upside of the module unit.

11. The image reading device according to claim 10 wherein the casing includes a top surface,
the image reading device further comprising:
a display panel disposed on the top surface; and
a display board disposed below the display panel and configured to drive the display panel.

12. The image reading device according to claim 1,
wherein the casing has a side wall positioned at one end of the casing in the first direction, and
wherein the antenna faces the side wall.

13. An image reading device comprising:
a casing having:
  a side wall positioned at one end thereof in a first direction; and
  another side wall positioned at another end of the casing in the first direction;
a roller accommodated in the casing, the roller being rotatable about a rotational axis extending in the first direction, the roller having a first end and a second end in the first direction, a length between the first end and the side wall being shorter than a length between the second end and the side wall;
an image reading unit accommodated in the casing and extending in the first direction and configured to read an image of an original document;
a motor positioned between the side wall and the first end in the first direction, the motor configured to rotate the roller; and
an antenna positioned between the another side wall and the second end in the first direction.

14. The image reading device according to claim 13, further comprising a board positioned between the another side wall and the second end in the first direction,
wherein the antenna is a line arranged on the board.

15. The image reading device according to claim 14, further comprising a module unit configured to control transmitting and receiving of the radio signal,
wherein the antenna is positioned on upside of the module unit.

16. The image reading device according to claim 15, wherein the module unit is arranged on the board.

17. The image reading device according to claim 14, further comprising a further board accommodated in the casing and mounting an electronic component, the further board being positioned below the roller.

18. The image reading device according to claim 17, wherein the board is orthogonal to the further board.

19. The image reading device according to claim 17, further comprising a CPU arranged on the further board and configured to control the image reading unit,
wherein the antenna is positioned on upside of the CPU.

20. The image reading device according to claim 19, wherein the further board is interposed between the CPU and the antenna.

* * * * *